US012743100B2

(12) United States Patent
Sato

(10) Patent No.: US 12,743,100 B2
(45) Date of Patent: Sep. 22, 2026

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Yoshihisa Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/169,264

(22) Filed: Apr. 3, 2025

(65) Prior Publication Data

US 2025/0328150 A1 Oct. 23, 2025

(30) Foreign Application Priority Data

Apr. 17, 2024 (JP) ................................ 2024-066760

(51) Int. Cl.

*G05D 1/639* (2024.01)
*G05D 1/648* (2024.01)
*G05D 1/667* (2024.01)

(52) U.S. Cl.

CPC ............. *G05D 1/642* (2024.01); *G05D 1/648* (2024.01); *G05D 1/667* (2024.01)

(58) Field of Classification Search

CPC ........ B25J 9/1697; B25J 9/1664; B25J 9/163; B25J 9/1666; B25J 9/1676; B25J 11/0085; B25J 19/023; G06T 7/73; G06T 7/70; G06T 7/521; G06T 7/60; G06T 7/246; G06T 1/0007; G06T 2207/30261; G05B 2219/40564; G05B 2219/39082; G05B 2219/40555; G05B 2219/37558; G05B 2219/40572; G05B 19/4183; G05D 1/0274; G05D 1/617; G05D 1/0212; G05D 1/693; G05D 1/246; G05D 1/2464; G05D 1/633; G05D 1/642; G05D 1/648; G05D 1/667; G05D 2105/28; G05D 2107/70; G05D 2109/10

See application file for complete search history.

(56) References Cited

U.S. PATENT DOCUMENTS

| | | | | |
|---|---|---|---|---|
| 10,571,918 | B2 * | 2/2020 | Xia | G05D 1/0274 |
| 2020/0205629 | A1 * | 7/2020 | Hong | A47L 9/2852 |
| 2022/0107654 | A1 * | 4/2022 | Miller | G05D 1/0287 |
| 2024/0201708 | A1 | 6/2024 | Sato | |
| 2025/0068182 | A1 * | 2/2025 | Chung | A47L 9/2826 |

FOREIGN PATENT DOCUMENTS

| | | |
|---|---|---|
| JP | 2015-9109 A | 1/2015 |

* cited by examiner

*Primary Examiner* — Ramon A. Mercado
*Assistant Examiner* — Noah W Stiebritz
(74) *Attorney, Agent, or Firm* — VENABLE LLP

(57) ABSTRACT

An information processing apparatus including an obstacle information acquisition unit configured to acquire obstacle information relating to an obstacle; a path information acquisition unit configured to acquire path information for a path on which a movable apparatus will move with respect to a plurality of movable apparatuses; an environment information acquisition unit configured to acquire environment information relating to a range in which the obstacle can be moved in an environment in which the movable apparatus is moving; and an obstacle movement destination determining unit configured to determine a movement destination for the obstacle based on the environment information and at least a movement distance for the obstacle.

9 Claims, 17 Drawing Sheets

| ID | Movable apparatus ID | Time stamp | Coordinates (x, y) |
|---|---|---|---|
| 1 | 1 | 1701157518 | (1, 2) |
| 2 | 1 | 1701157519 | (1, 3) |
| 3 | 1 | 1701157520 | (1, 4) |
| 4 | 1 | 1701157521 | (3, 2) |
| 5 | 2 | 1701157518 | (3, 2) |
| 6 | 2 | 1701157519 | (3, 2) |
| 7 | 2 | 1701157520 | (6, 4) |
| 8 | 3 | 1701157518 | (5, 3) |
| 9 | 3 | 1701157519 | (4, 2) |

| ID | Classification | Coefficient |
|---|---|---|
| 1 | A | 1 |
| 2 | B | 2 |
| 3 | C | 3 |

Figure 14:
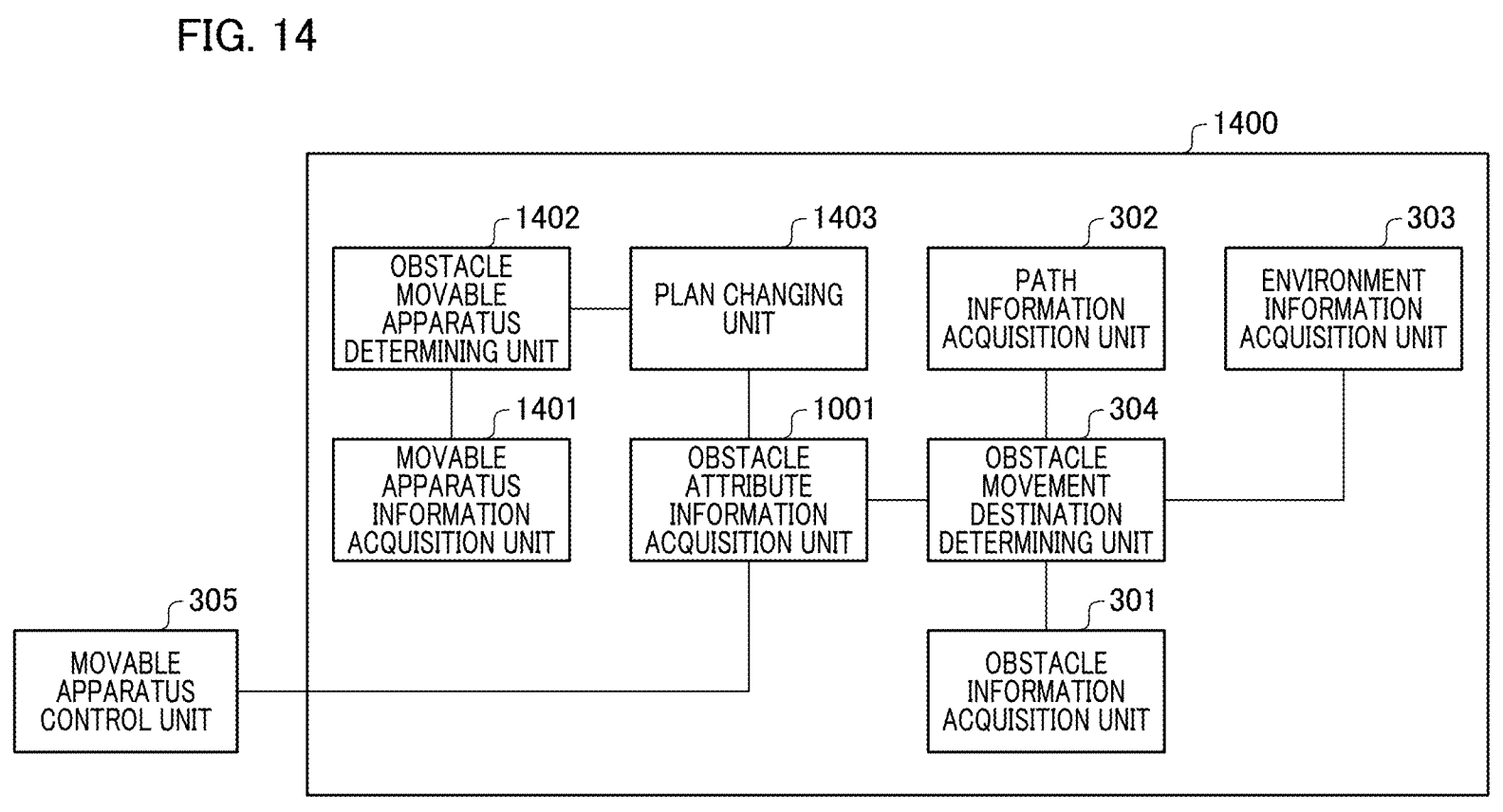

303 ENVIRONMENT INFORMATION ACQUISITION UNIT

302 PATH INFORMATION ACQUISITION UNIT

304 OBSTACLE MOVEMENT DESTINATION DETERMINING UNIT

301 OBSTACLE INFORMATION ACQUISITION UNIT

1403 PLAN CHANGING UNIT

1001 OBSTACLE ATTRIBUTE INFORMATION ACQUISITION UNIT

1402 OBSTACLE MOVABLE APPARATUS DETERMINING UNIT

1401 MOVABLE APPARATUS INFORMATION ACQUISITION UNIT

305 MOVABLE APPARATUS CONTROL UNIT

| ID | Movable apparatus information | Corresponding obstacle classification |
|---|---|---|
| 1 | a | A, B |
| 2 | b | B |
| 3 | c | A, B, C |

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, a storage medium, and the like.

Description of the Related Art

In recent years, the optimization of transport and cleaning for products in manufacturing lines and transport warehouses in factories, as well as in hospitals, home settings, and the like have been automated by using automatously moving robots. In addition, in a case in which obstacles such as luggage and the like exist on a travel route in the environment that is the space in which the robot will operate, this is solved by the autonomously traveling robot changing the travel route or moving the obstacle to a different position.

Japanese Unexamined Patent Application, First Publication No. 2015-009109 discloses a technology in which a cleaning robot performs cleaning after moving an obstacle to a position that has been determined in advance in which it will not disrupt the cleaning.

However, in the configuration in Japanese Unexamined Patent Application, First Publication No. 2015-009109, there are cases in which, if a plurality of autonomously moving robots are being operated, the task efficiency for the robot group as a whole decreases. In addition, in the method that is disclosed in Japanese Unexamined Patent Application, First Publication No. 2015-009109, there are cases in which limitations of movement are exceeded in order to move the obstacles.

SUMMARY OF THE INVENTION

An information processing apparatus according to one aspect of the present invention is an information processing apparatus comprising at least one processor or circuit configured to function as: an obstacle information acquisition unit configured to acquire obstacle information relating to an obstacle; a path information acquisition unit configured to acquire path information for a path on which a movable apparatus will move with respect to a plurality of movable apparatuses; an environment information acquisition unit configured to acquire environment information relating to a range in which the obstacle can be moved in an environment in which the movable apparatus is moving; and an obstacle movement destination determining unit configured to determine a movement destination for the obstacle based on the environment information and at least a movement distance for the obstacle.

Further features of the present invention will become apparent from the following description of embodiments with reference to the attached drawings.

BRIEF DESCRIPTION OF THE DRAWINGS

FIG. 6 is a diagram showing an example of a path information management database according to the First Embodiment.

FIG. 13 is a diagram showing an example of a classification database in the Second Embodiment.

FIG. 14 is a functional block diagram showing a configuration of an information processing apparatus 1400 according to a Third Embodiment.

FIG. 16 is a diagram showing an example of a movable apparatus information management database in the Third Embodiment.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate descriptions will be omitted or simplified.

First Embodiment

Figure 1:
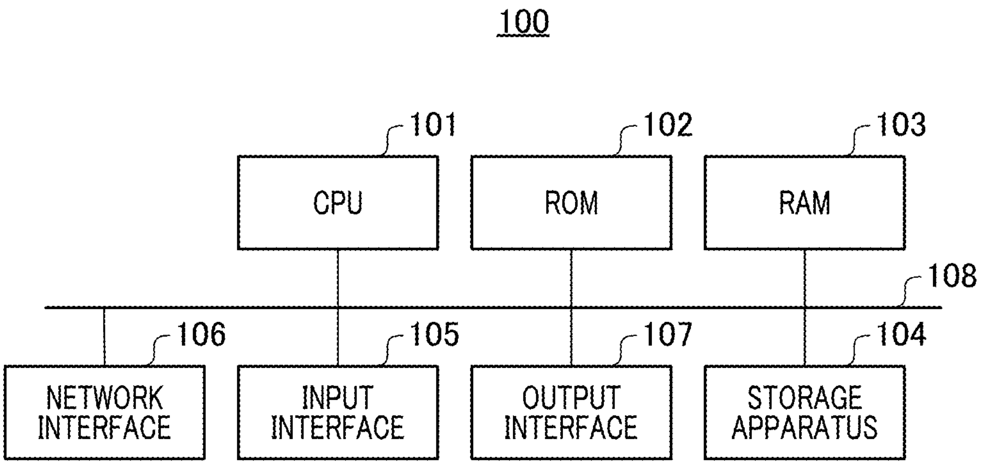
FIG. 1 is diagram showing an example of a hardware configuration for an information processing apparatus 100 according to a First Embodiment of the present invention.

FIG. 1 is a diagram showing an example of a hardware configuration of the information processing apparatus 100 according to the First Embodiment of the present invention. In FIG. 1, a numeral 101 is a CPU that functions as a computer that controls the entirety of the information processing apparatus 100, a numeral 102 is a ROM that stores programs and parameters, and a numeral 103 is a RAM 103 that temporarily stores programs and data that are provided from an external apparatus and the like.

A numeral 104 is an external storage apparatus such as a hard disk, a memory card, and the like. However, 104 may also be housed inside of the information processing apparatus 100, or it may also be a detachable apparatus. For example, this may also be an optical disk such as a CD and the like, a magnetic or optical card, an IC card, a memory card, and the like. A numeral 105 is an interface with an input device such as a pointing device and keyboard, and the like that receives operations from the user and inputs data.

A numeral 106 is a network interface for connecting to a network line such as an internet 111 and the like. A numeral 107 is an output interface with an output device 110 such as a monitor and the like for displaying data that is held on the information processing apparatus 100, and data that has been provided to the information processing apparatus 100. A numeral 108 is a system bus that communicably connects each of the units 101 to 107.

Figure 2:
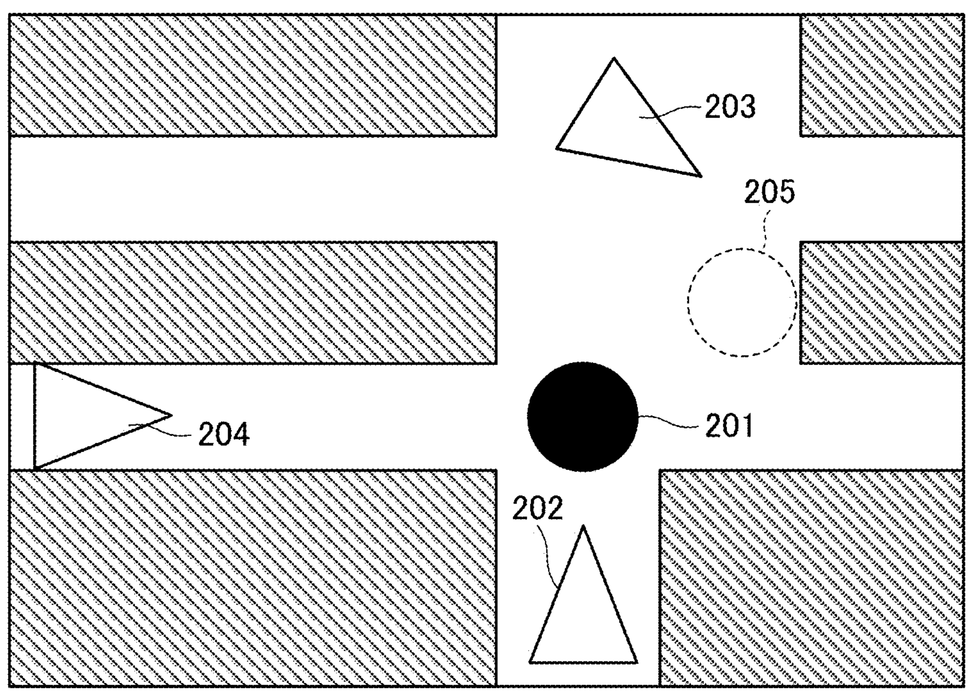
FIG. 2 is a diagram showing a usage example of the First Embodiment of the present invention.

FIG. 2 is a diagram showing a usage example of the First Embodiment of the present invention. In the usage image that is shown in FIG. 2, each of a plurality of movable apparatuses 202 to 204 are executing their respective tasks inside of an environment. It is assumed that an information processing apparatus according to the First Embodiment is installed on each of the movable apparatuses 202 to 204.

Note that the movable apparatus in the First Embodiment is an autonomously movable apparatus such as, for example, an AGV (Automated Guided Vehicle), an AMR (Autonomous Mobile Robot), and the like.

However, this may also be configured such that the information processing apparatus 100 according to the present embodiment is provided to a control terminal that is in a position that is removed from the movable apparatus, and a plurality of movable apparatuses are controlled remotely via a wireless network.

In the example in FIG. 2, an obstacle 201 exists in the movement direction of a movable apparatus 202, and it becomes impossible for the movable apparatus 202 to continue the task. In such a circumstance, in the First Embodiment, a position for which there is a low possibility that this position will be used during the execution of tasks by the plurality of movable apparatuses that are operating within the environment, and for which the obstacle will be moved as little as possible from its current position, that is a position in which the movement amount for the obstacle can be minimized, is determined as a movement destination 205 for the obstacle.

By moving the obstacle to the movement destination 205 that was described above, it becomes possible for the movable apparatus 202 to continue the execution of the task. In addition, the movement destination for the obstacle also does not have a large effect on other movable apparatuses that are moving within the environment, and therefore, it is difficult for this to interfere with the execution of a task by another movable apparatus. Furthermore, by minimizing the movement amount for the obstacle, even if there is a limit on the movement range for the obstacle, it is possible to make the movement amount be within this limitation range.

Figure 3:
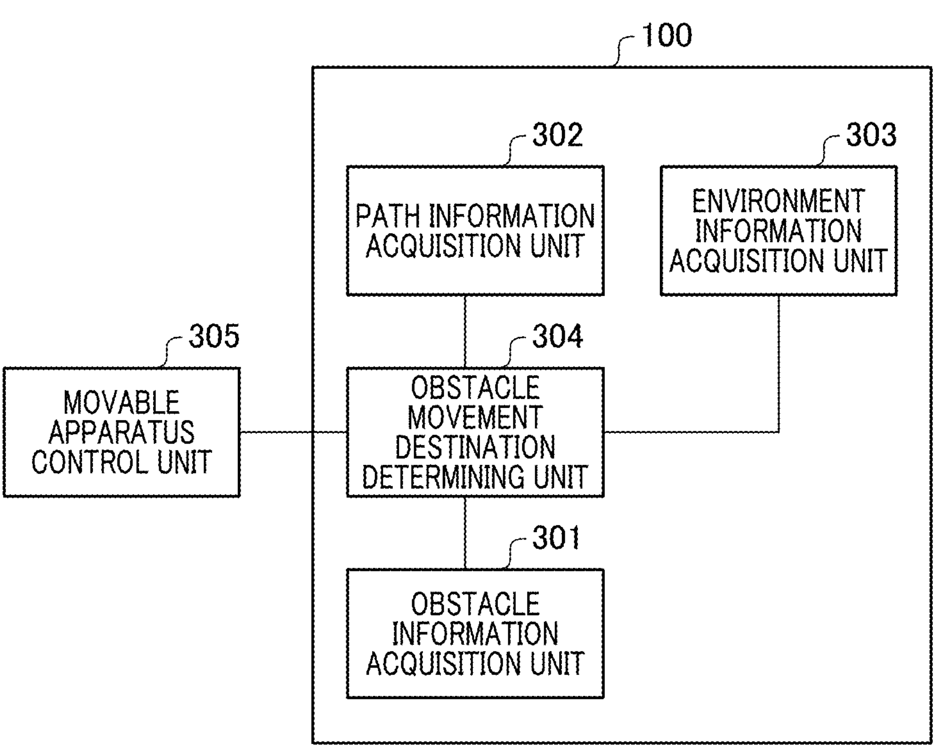
FIG. 3 is a functional block diagram showing a configurational example of an information processing apparatus according to the First Embodiment.

FIG. 3 is a functional block diagram showing a configurational example of the information processing apparatus according to the First Embodiment. Note that a portion of the functional blocks that are shown in FIG. 3 are realized by the CPU and the like that serves as a computer that is included in the information processing apparatus executing a computer program that has been stored on a memory serving as a storage medium.

However, it may also be made such that a portion or the entirety of these functional blocks are realized by hardware. As the hardware, an application-specific integrated circuit (ASIC), a processor (a reconfigurable processor, a DSP) and the like can be used.

In addition, each functional block that is shown in FIG. 3 does not need to be housed in the same body, and they may also be configured by separate devices that have been connected to each other via signal paths. Note that the above explanation in relation to FIG. 3 also applies in the same manner to FIG. 10, and FIG. 14.

The information processing apparatus 100 according to the present embodiment has an obstacle information acquisition unit 301, a path information acquisition unit 302 that acquires path information for paths on which a plurality movable apparatuses will move inside an environment, and an environment information acquisition unit 303 that acquires information for an environment in which the movable apparatus operates.

The obstacle information acquisition unit 301 acquires obstacle information relating to obstacles. The path information acquisition unit 302 acquires path information for paths on which each movable apparatus will move with respect to a plurality of movable apparatuses. The environment information acquisition unit 303 acquires environment information relating to a range in which an obstacle can be moved in the environment in which the movable apparatus is moving.

In addition, the information processing apparatus 100 has an obstacle movement destination determining unit 304. The obstacle movement destination determining unit 304 determines a movement destination for an obstacle based on the environment information and at least a movement distance for the obstacle. Furthermore, the obstacle movement destination determining unit 304 may also determine the movement destination for the obstacle based on at least one of the obstacle information, and the path information.

In the present embodiment, the obstacle movement destination determining unit 304 determines the movement destination for the obstacle based on the information for the obstacle that has been acquired by the obstacle information acquisition unit 301, the path information that has been acquired by the path information acquisition unit 302, and the environment information that was acquired by the environment information acquisition unit 303. Note that the obstacle information includes at least the position information for the obstacle.

A movable apparatus control unit 305 controls the movable apparatus such that the movable apparatus moves the obstacle to the movement destination that has been determined by the obstacle movement destination determining unit. The control for moving the obstacle includes operation controls that, for example, push and lift up the obstacle. Note that the method for moving the obstacle is not limited thereto, and the obstacle may be moved using any type of method.

Figure 4:
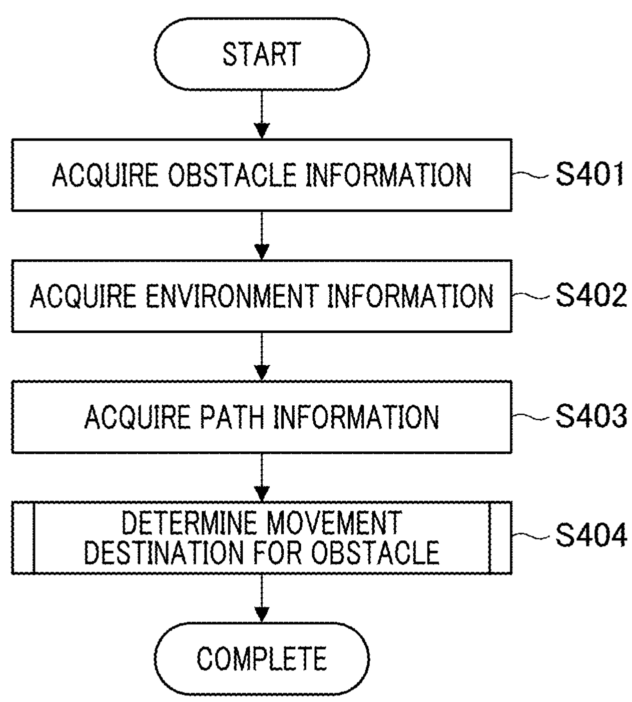
FIG. 4 is a flowchart showing a processing example for an information processing method that is performed by the information processing apparatus 100 according to the First Embodiment.

Next, FIG. 4 is flowchart showing a processing example for an information processing method that is performed by the information processing apparatus 100 according to the First Embodiment. Note that the operations for each step of the flowchart in FIG. 4 are performed in order by the CPU and the like that serves as a computer inside of the information processing apparatus executing a computer program that has been stored on a memory.

During step S401, the obstacle information acquisition unit 301 recognizes the position and size of obstacles that exist on the path of the movable apparatus. In the present embodiment, the recognition of the position and size of the obstacle is performed using image recognition on an image from a camera that has been attached to the movable apparatus. In this context, step S401 functions as an obstacle information acquiring step configured to acquire obstacle information relating to an obstacle.

Note that the recognition of the position and size of the obstacle may also use LiDAR (Light Detection And Ranging), and a TOF (Time of Flight) sensor. In addition, the coordinate system for the position of the obstacle and the coordinate system for the path information that will be described below use the same coordinate system as the coordinate system for the information for the environment that will be described below.

During step S402, the environment information acquisition unit 303 acquires information for the environment in which the movable apparatus operates. The information for the environment that is acquired includes a range in which the obstacle can be moved within the environment, a range in which the obstacle cannot be moved within the environment, and the like. The information for the environment is, for example, map information in which the environment in which the movable apparatus operates is expressed using a coordinate system, and this information defines the region in which the obstacle can be moved and the region in which the obstacle cannot be moved.

In this context, step S402 functions as an environment information acquiring step configured to acquire environment information relating to a range in which the obstacle can be moved in the environment in which the movable apparatus operates. Note that the environment information is managed in a database, and is acquired from the database. However, it is assumed that the database is managed by each movable apparatus. The environment information uses information that has been created in advance.

Figure 5:
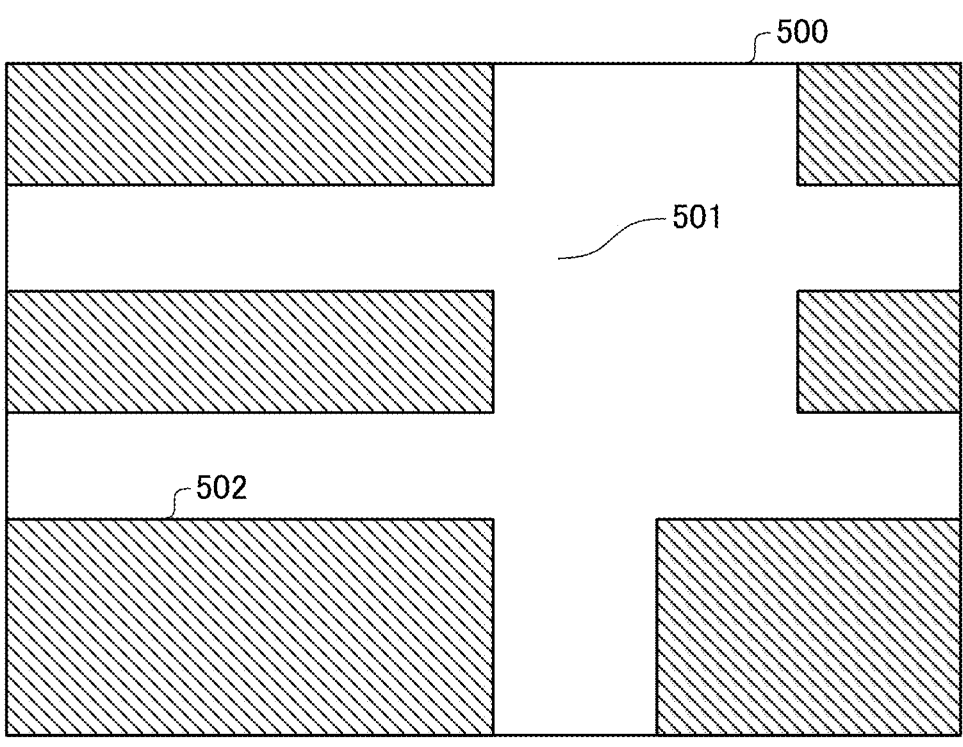
FIG. 5 is a diagram showing an example of environment information according to the First Embodiment.

FIG. 5 is a diagram showing an example of environment information in the First Embodiment. The environment information that is acquired is expressed as, for example, a map in the manner of the environment information 500 that is shown in FIG. 5, and the environment information 500 includes information for the shape, position, and orientation of a closed region 501 that corresponds to a "path range" that shows the range in which movement is possible. In addition, the environment information 500 includes information for the shape, position, and orientation of a closed region 502 that corresponds to a "range in which movement is not possible", which shows the range in which the obstacle cannot be moved.

During step S403, the path information acquisition unit 302 acquires the path information. The path information includes information for a planned path on which the movable apparatus that is being operated in the environment will travel, and information for paths on which each of the movable apparatuses that are operating in the environment have travelled previously. Specifically, the information that is acquired includes passing point coordinates, the IDs for movable apparatuses that will pass through/have passed through these passing points, and time stamps showing times at which these passing point coordinates will be passed through/have been passed through. In this context, step S403 functions as a path information acquiring step configured to acquire path information for a path on which a movable apparatus will move with respect to a plurality of movable apparatuses.

As the acquisition method, the path information for the movable apparatus is, for example, managed in a path information management database, and the information processing apparatus 100 acquires information from the path information management database. Note that it is assumed that the path information management database is managed by each movable apparatus.

The path information management database is created in advance. That is, with respect to the information for paths on which a movable apparatus has previously travelled, the coordinate information for each movable apparatus is acquired in advance, and this is created by storing the coordinate information that has been gathered in the path information management database. With respect to the information for the paths on which travel is planned, these are determined by planning the paths that each movable apparatus will travel on in advance, and the information is created by storing the information for the planned paths that has been determined in the path information management database.

FIG. 6 is a diagram showing an example of a path information management database according to the First Embodiment, and the path information management database is managed in a format such as, for example, the format that is shown in FIG. 6. The "ID" column in the path information management database 601 that is shown in FIG. 6 manages the IDs for uniquely identifying each datum. The path information management database 601 manages a plurality of sets of data consisting of a movable apparatus ID, a time stamp, and coordinates.

During S404, the obstacle movement destination determining unit 304 determines the movement destination for the obstacle. The detailed processing for this determination will be explained using FIG. 7. Note that step S404 functions as an obstacle movement destination determining step configured to determine a movement destination for an obstacle based on the environment information and at least the movement distance for the obstacle.

Figure 7:
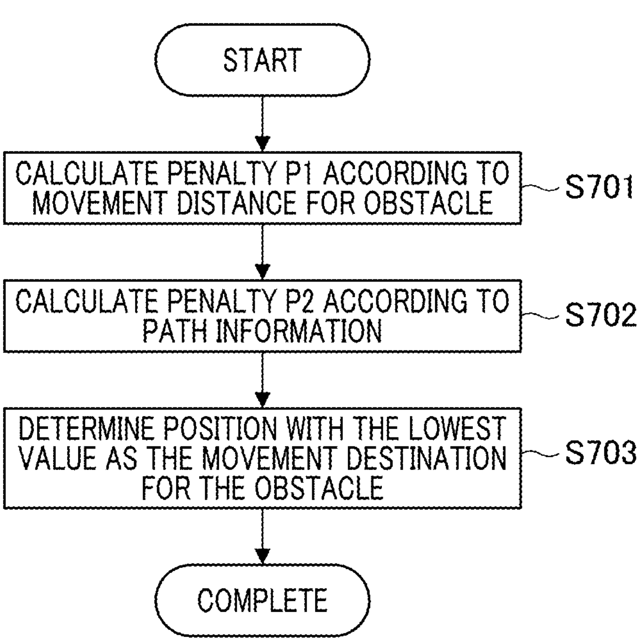
FIG. 7 is a flowchart showing a processing example for a step S404 that determines a movement destination for an obstacle in the First Embodiment.

FIG. 7 is a flowchart showing an example of the processing for step S404 during which the movement destination for the obstacle is determined in the First Embodiment. Note that the operations for each step of the flowchart in FIG. 7 are performed in order by the CPU and the like that serves as a computer inside of the information processing apparatus executing a computer program that has been stored on a memory.

In the flowchart in FIG. 7, a penalty for moving the obstacle and a penalty for becoming an obstacle to the movement of another movable apparatus are both calculated, and the suitability as a movement destination for the obstacle is evaluated by using the sum total of these penalties. It is thereby made possible to inhibit the lowering of the task efficiency for the entirety of the plurality of movable apparatuses and to determine the movement destination for the obstacle while also adhering to the movement restrictions for the obstacle.

That is, first, during step S701, the information for the obstacle that was acquired during step S401 and the environment information that was acquired during step S402 are used, a score for a penalty P1 according to the movement range of the obstacle is calculated, and this is associated with the environment information. That is, for example, the environment information (the range in which the obstacle can be moved) is broken into even intervals in a grid form, each grid point is defined as a candidate point, and a score for the penalty according to the movement distance is associated with a candidate point.

The width and height of the grid are defined in advance. The score for the penalty P1 according to the movement distance for the obstacle shows a degree of unsuitability for a point as the movement destination for the obstacle with the meaning that there will be a large cost for this movement, and the higher that the score is, a point is defined as being unsuitable as the movement destination of the obstacle. That is, the score for the penalty P1 according to the movement distance for the obstacle means the movement cost for the obstacle for this point.

The score for the penalty P1 according to the movement distance for the obstacle that is associated with a candidate point uses a constant value that has been defined in advance per fixed movement distance range. In the present embodiment, the movement range for the obstacle of 0 m or greater but less than 10 m is made a penalty of 1, the range of 10 m or greater but less than 20 m is made a penalty of 2, the range of 20 m or greater but less than 30 m is made a penalty of 3, and the range of 30 m or greater is made a penalty of 4.

Figure 8:
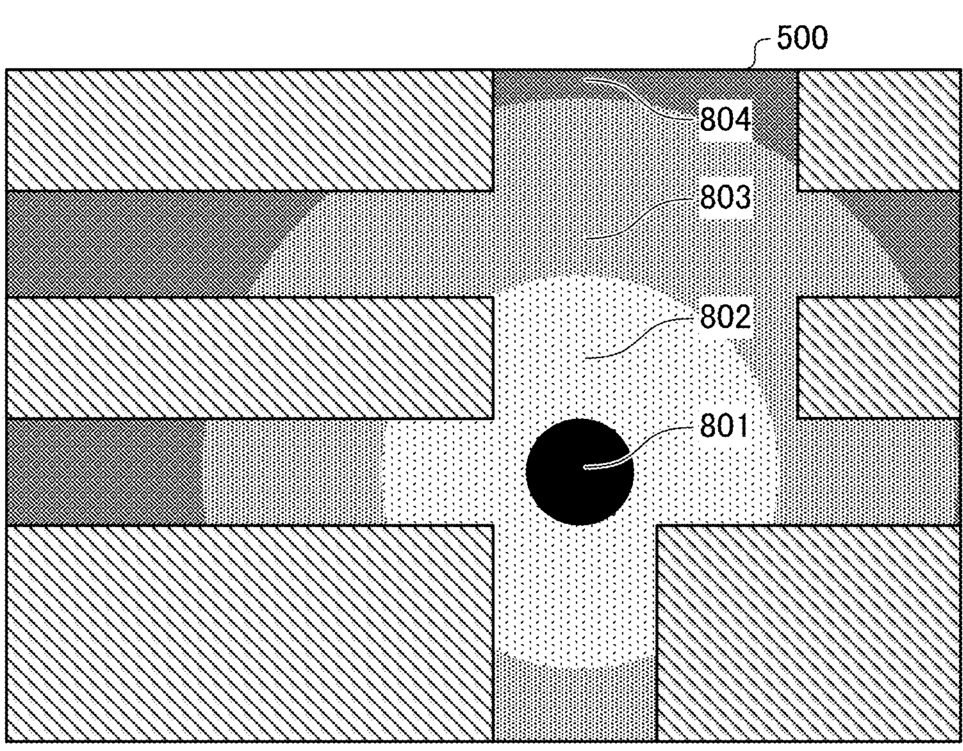
FIG. 8 is a diagram showing an example of associating a score for a penalty P1 according to a movement distance for an obstacle with each of the coordinates in the First Embodiment.

FIG. 8 is a diagram showing an example of associating the scores for the penalty P1 according to the to the movement distance for the obstacle with each coordinate in the First Embodiment. In the example that is shown in FIG. 8, a state is shown in which the scores for the penalty P1 according to the movement distance for the obstacle have been associated with the environment information 500 that was shown in FIG. 5.

In FIG. 8, a numeral 801 shows the obstacle. A region 802 to a region 804 that are shown in FIG. 8 show the scores for their respective scores for the penalty P1 according to the movement distance for the obstacle using the concentration of their color. The region that is shown by the region 802 is a region showing that the movement distance is a distance that is 0 m or greater but less than 10 m, and shows that the score for the penalty P1 according to the movement distance for the obstacle is 1.

The region that is shown by the region 803 is a region showing a movement distance that is a distance of 10 m or greater but less than 20 m, and shows that the score for the penalty P1 according to the movement distance for the obstacle is 2. The region that is shown by the region 804 is a region showing a movement distance that is a distance of 20 m or greater but less than 30 m, and shows that the score for the penalty P1 according to the movement distance for the obstacle is 3.

Note that in the example of FIG. 8, the score for the penalty is determined according to the distance from the center of the obstacle. That is, the score is calculated according to a distance from the position of the obstacle until the movement destination candidate point, and the movement destination for the obstacle is thereby determined. However, in reality, the length of the path for moving the obstacle will change due to walls and the like, and therefore, the score for the penalty may also be determined according to the length of the movement path for the obstacle. That is, the distance from the position of the obstacle until the movement destination candidate point may also be the distance for the movement path for the obstacle.

During step S702, the path information that was acquired during step S403 is used, the score for the penalty P2 according to the path information for the movable apparatus is calculated, and this is associated with the environment information. As the method for associating the score with the environment information, the score for the penalty P2 according to the path information is associated with each candidate point that was defined during step S701.

The score for the penalty P2 according to the path information for the movable apparatus shows a degree of unsuitability as the movement destination for the obstacle with the meaning of the movable apparatus that operates within the environment using that path, and the higher that this score is, it is defined that this point is unsuitable as the movement destination for the obstacle.

Note that the calculation of the score for the penalty P2 according to the path information for the movable apparatus is performed by adding a constant that has been determined in advance to a region that has been given a fixed width that was set in advance centered on a broken line that links the passing points for each path.

That is, the penalty for each of the candidate points becomes a value in which the penalties for each path have all been totaled with respect to all of the paths. Note that although the fixed width that was explained above uses the horizontal width for each movable apparatus in the present embodiment, the present disclosure is not limited thereto, and for example, this may also be manually set by the user of the apparatus of the present embodiment.

Figure 9:
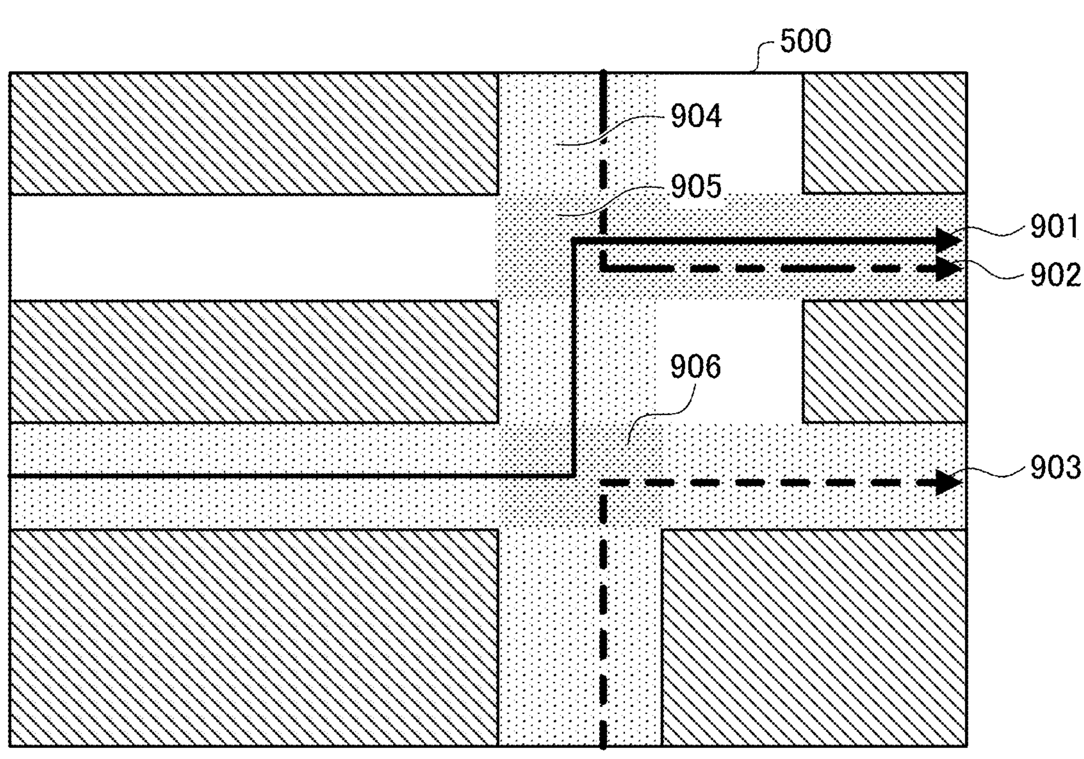
FIG. 9 is a diagram showing an example of associating a score for a penalty P2 according to path information for the movable apparatus with each of the coordinates in the First Embodiment.

FIG. 9 is a diagram showing an example of associating the scores for the penalty P2 according to the path information for the movable apparatus with each coordinate in the First Embodiment. In the example that is shown in FIG. 9, a state is shown in which the penalty scores P2 according to the path information have been associated with each candidate point that was defined during step S701 on top of the environment information 500.

The arrows 901 to 903 that are shown in FIG. 9 shows the paths that have been acquired during step S403. For example, the arrow 901 shows information in which data in which the "movable apparatus ID" is "1" has been extracted from the path information management database 601 that was shown in FIG. 6, and a series of coordinate information has been extracted by using the time information that is disclosed in the "time stamp column" for this information to serve as a path.

In the same manner, the arrow 902 shows the path information for the movable apparatus for which the "movable apparatus ID" is "2", and the arrow 903 shows the path information for the movable apparatus for which the "movable apparatus ID" is "3".

The regions 904 and 905 that are shown in FIG. 9 show their respective scores for the penalty P2 according to the path information using the concentration of their color.

In this example, the region for the color that is shown in region 904 shows that this region has a lower score for the penalty P2 according to the path information than for the region having the color that is shown in the region 905. In addition, in FIG. 9, the regions in which there is no color in the environment information 500 show regions for which the penalty score P2 according to the path information is 0.

In the example that is shown in FIG. 9, the region 904 uses only the path information that is shown by the arrow 902, and therefore, the score for penalty P2 according to the path information for this region becomes 1. Two pieces of path information shown by the arrow 901 and the arrow 902 exist in the region 905. Therefore, the scores for the penalty P2 according to the path information are calculated according to both the arrow 901 and the arrow 902, and the score for the penalty P2 according to the path information for this region 905 becomes 2.

Two pieces of path information, shown by the arrow 901 and the arrow 903, also exist in the region 906. Therefore, the scores for the penalty P2 according to the path information are calculated according to both the arrow 901 and the arrow 903, and the score for the penalty P2 according to the path information for this region 906 becomes 2.

Note that in the present embodiment, although the score is made higher for regions in which there is a plurality of overlapping path information, it may also be made such that the score is made higher the closer that the current time is to the planned time at which each movable apparatus will pass through a region in which there is a plurality of overlapping paths. Conversely, the score may also be made lower the farther away the current time is from the planned time at which each movable apparatus will pass through a region in which there are a plurality of overlapping paths.

During step S703, the scores for each of the penalties that have been associated with each of the candidate points in the environment information that were calculated during step S701 and step S702 are used and the movement destination for the obstacle is determined. Specifically, the information for the size of the obstacle that was acquired during step S401 is used, and the position (region) with the lowest value for the total of each penalty for the coordinates that will be used when the obstacle has been moved is searched for from within the range in which movement is possible, and this is determined to be the movement destination for the obstacle.

At this time, the score becomes higher the wider that the overlapping range for the path information for the movable apparatus and the region taken up by the obstacle is, and the score becomes lower the more narrow that this overlapping range becomes. That is, the movement destination for the obstacle is determined according to the overlapping range for the region through which the movable apparatus will pass and the region taken up by the obstacle in the movement destination candidate point. It is thereby possible to determine the movement destination for the obstacle while both lessening the decrease in the task efficiency for the entirety of the group of movable apparatuses that consists of a plurality of movable apparatuses (autonomously movable robots and the like) and adhering to the movement restrictions.

Note that although in the present embodiment the score is calculated based on the obstacle information and the path information, it is sufficient if the score for each movement destination candidate point is calculated based on at least one of the obstacle information and the path information, and the movement destination for the obstacle is determined based on the score.

Note that in the First Embodiment, although image recognition using a camera that is attached to the movable apparatus was performed as the acquisition method for the size and position of the obstacle by the obstacle information acquisition unit 301, the present disclosure is not limited thereto. For example, this may also be performed by image recognition using a plurality of network cameras and the like that have been installed inside of the environment in which the movable apparatus will operate.

A model that has been created using machine learning may also be used as the image recognition method. In addition, this may also be performed by object recognition using a pressure sensor that has been attached to the movable apparatus, and a laser sensor such as the laser sensor that is described above. In addition, it may also be made such that only the position of the obstacle is acquired in the obstacle information acquisition unit 301 and a fixed numerical value that has been defined in advance may be used for the size of the obstacle.

Although in the present embodiment, the path information management database was created in advance, the path information management database may also be continuously updated. In this case, the information for the paths that were previously used may also be updated by continuously acquiring the coordinate information for each movable apparatus and storing this information in the path information management database.

The information for the planned paths to be used by the movable apparatus may also be updated by calculating the time at which each coordinate will be passed through from a search for a path from the current coordinates for the movable apparatus to the coordinates for the destination on a plan and the speed of each movable apparatus, and storing the results of in the path information management database.

It is thereby possible to determine the movement destination for the obstacle by using the latest path information. In the example explained above, in a case in which it is necessary to acquire the position information for the movable apparatus that is operating in the environment, for example, the position information for each movable apparatus may also be acquired by installing a GPS sensor on each movable apparatus, and the position information for each movable apparatus may also be acquired by using SLAM and the like using an acceleration sensor and a camera.

Note that although in the present embodiment, the information for time stamps is managed in the path information management database 601, it may also be made such that the time stamps are not managed in the path information management database 601, and the information for the order in which the passing points are passed through may also be assigned to the coordinates for each of the passing points in the path information management database.

In addition, although in the present embodiment, the environment information (range in which the obstacle can be moved) uses information that was created in advance, this may also be continuously updated in real time. In this case, for example, changes in the positions of objects within the environment may also be detected using object recognition by cameras that have been installed in the environment and on the movable apparatuses that operate within the environment, and the range in which movement is not possible may also be updated. It is thereby possible to determine the movement destination for the obstacle by using the most recent environment information.

In addition, in the present embodiment, when associating each penalty with the environment information, this association was performed using the candidate points (each grid point) that were defined during step S701. However, when associating the individual candidate points that were defined for each penalty and finding the total penalty using the processing for step S703, these may also be added up after having converted this to a common coordinate system.

In addition, in the present embodiment, the calculation of the score for the penalty P1 according to the movement distance for the obstacle was performed by associating regions per a predetermined distance with the environment information using the position of the obstacle as the center, and giving each region a constant that was defined in advance. However, the present disclosure is not limited thereto.

The score for the penalty P1 may also be calculated such that it increases proportionally to the distance with the position of the obstacle as the center. In this case, the coefficient that is used to increase the score for the penalty P1 according to the movement distance for the obstacle may also use a constant that was determined in advance.

In the present embodiment, the calculation of the score for the penalty P2 according to the path information for the movable apparatus was performed by adding a constant that was determined in advance to a predetermined width that was set in advance with each path information for the movable apparatus as the center. However, the path information for a movable apparatus may also be used and the residence time for each movable apparatus in a coordinate that is being used as a path may be calculated, and the score for the penalty may also be made higher the longer that the residence time is.

It is thereby possible to determine a position with a shorter residence time as the movement destination for the obstacle. In addition, the score for the penalty P2 according to the path information for the movable apparatus may also be increased and decreased according to a degree of priority for a task when each movable apparatus is using this path.

That is, it is made such that a higher penalty score is assigned the higher that the degree of priority for a task is, and a lower penalty score is assigned the lower that the degree of priority for a task is. It is thereby possible to determine a position that will not interfere with the execution of tasks by a movable apparatus that is implementing a task with a higher degree of priority as the movement destination for the obstacle.

In addition, the score for the penalty P2 according to the path information for the movable apparatus may also be increased and decreased according to differences in task schedules for when each movable apparatus will be using this path. It is made such that a path that will be used by a movable apparatus with a task that is running behind schedule is assigned a higher penalty score, and it is made such that a path that will be used by a movable apparatus with a task that is running ahead of schedule is assigned a lower penalty.

It is thereby possible to determine a position that does not interfere with a movable apparatus that is implementing a task that is behind schedule as the movement destination for the obstacle. In addition, the score for the penalty P2 according to the path information may also be increased or decreased using the information for the time at which each movable apparatus last used that path.

In addition, the score for the penalty P2 according to the path information is made higher the closer to the current time that the time at which each path was last used is. It is thereby possible to determine the movement destination for the obstacle by taking into consideration the most recent usage conditions.

Although in the present embodiment a numerical value in which each penalty was totaled was used in order to determine the movement destination for the obstacle during step S703, the present disclosure is not limited thereto. A numerical value in which each penalty has been multiplied may also be used. In addition, a weighted coefficient may also be applied to each penalty taking into consideration the degree of priority for each penalty.

That is, it is made such that the penalties that should be given importance have a high coefficient applied to them, and the penalties that do not need to be given importance have a low coefficient applied to them. It is thereby possible to determine the movement destination for the obstacle by taking into consideration the degrees of priority among each penalty.

The penalty that is applied to each penalty may be defined in advance, or it may also be dynamically determined. For example, the total time for which each movable apparatus is behind schedule may be calculated, and the coefficient for the score for the penalty P2 according to the path information may also be made larger in proportion with this time. It is thereby possible to determine a position that will not interfere with the execution of the tasks by each movable apparatus such that the later the schedule is from the appointed time, this position will not cause a greater delay as the movement destination for the obstacle.

In addition, although the present embodiment used each type of database for the storage and acquisition of information, the number of rows and the number of columns for each type of database that was explained in the present embodiment is not limited to the number of rows and the number of columns that were explained above. The number of rows and the number of columns may also be made larger or smaller than these numbers.

In addition, although in the present embodiment each type of database is managed by each movable apparatus, the present disclosure is not limited thereto. It may also be made such that each type of database is managed by a central management apparatus such as a server and the like, and the information that is managed by each type of database is acquired by each movable apparatus communicating with the central management apparatus.

Second Embodiment

In the First Embodiment, the obstacle movement destination determining unit 304 was used, and the score for the penalty P1 according to the movement distance for the obstacle was calculated according to the distance that the obstacle would be moved from its original position. At this time, the increase ratio for the score for the penalty according to the movement distance was fixed.

In relation to this, in the Second Embodiment, by adding an obstacle attribute information acquisition unit 1001 to the configuration of the First Embodiment, the coefficient that is used in the calculation of the score for the penalty P1 according to the movement distance for the obstacle is changed according to the attributes of the obstacle.

That is, the movement destination for the obstacle is determined based on the attribute information for the obstacle. Specifically, the movement destination for the obstacle is determined according to, for example, whether or not the attribute information includes information relating to areas where passage is prohibited. Conversely, the movement destination for the obstacle is determined according to the weight of the obstacle based on the attribute information.

It is thereby possible to inhibit the movement of obstacles for which a large cost will be incurred due to this movement such as for obstacles for which large movements from their current position will cause problems, such as when there are pylons, road signs, and the like showing that passage through an area is prohibited, for heavy obstacles, and the like.

Figure 10:
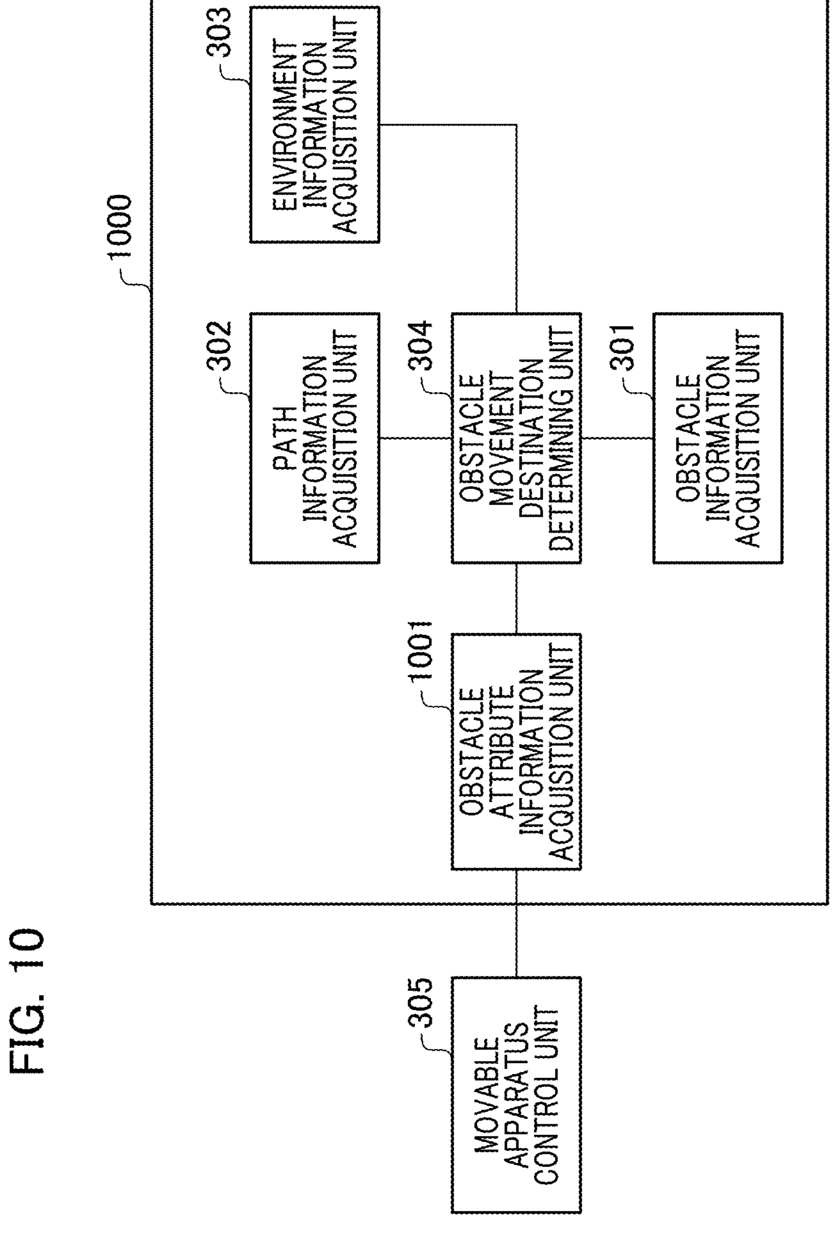
FIG. 10 is a functional block diagram showing a configurational example of an information processing apparatus 1000 according to the Second Embodiment.

FIG. 10 is a functional block diagram showing a configurational example of the information processing apparatus 1000 according to the Second Embodiment. The information processing apparatus 1000 according to the present embodiment is provided with the obstacle attribute information acquisition unit 1001 in addition to the configuration of the information processing apparatus 100 that was explained in the First Embodiment. That is, in the Second Embodiment, as is shown in FIG. 10, the obstacle attribute information acquisition unit 1001 is disposed, for example, between the movable apparatus control unit 305 and the obstacle movement destination determining unit 304.

Figure 11:
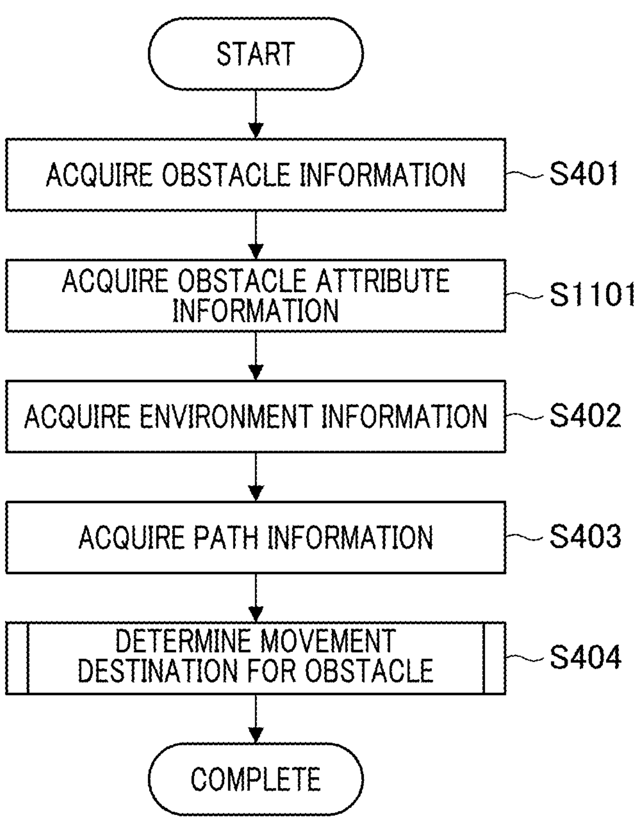
FIG. 11 is a flowchart showing an example of a processing flow for an information processing method according to the Second Embodiment.

FIG. 11 is a flowchart showing an example of a processing flow for the information processing method in the Second Embodiment, and the flowchart in FIG. 11 differs from the flowchart showing the basic flow for the First Embodiment that was explained using FIG. 4 on the point that the processing for step S1101 has been added thereto. In addition, the processing contents for step S404 are different.

Note that the operations for each step of the flowchart in FIG. 11 are performed in order by the CPU and the like that serves as a computer inside of the information processing apparatus executing a computer program that has been stored on a memory.

During step S1101, the obstacle attribute information is acquired by the obstacle attribute information acquisition unit 1001. That is, the obstacle information acquisition unit 301 performs image recognition based on an image that was captured by a camera that is installed on the movable apparatus, and recognizes at least one attribute from among the type, size, estimated weight, and the like of the obstacle.

As specific examples, the classifying attributes include, for example, at least one of road signs, heavy objects, portable objects, and the like. In addition, as an example of the classifications, for example, pylons or road signs showing areas in which passage is prohibited are classified as signs, cases in which the size of an obstacle that has been acquired by the obstacle information acquisition unit 301 is a predetermined amount or more are classified as heavy objects, and cases other than these are classified as portable objects.

Figure 12:
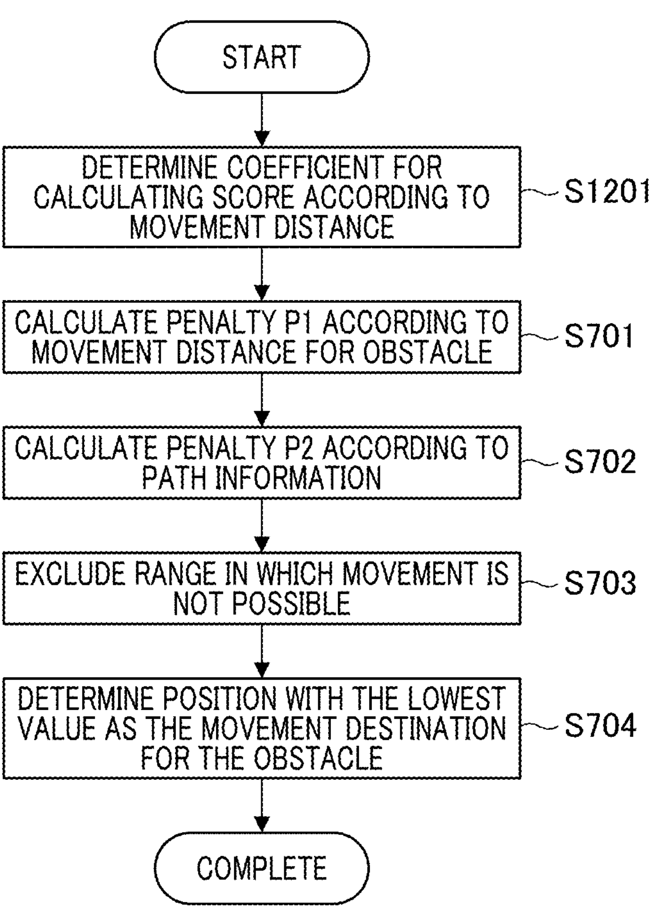
FIG. 12 is a flowchart showing a processing example for a step S404 that determines a movement destination for an obstacle in the Second Embodiment.

FIG. 12 is a flowchart showing the processing for the step S404 during which the movement destination for the obstacle is determined in the Second Embodiment. Note that the operations for each step of the flowchart in FIG. 12 are performed in order by the CPU and the like that serves as a computer inside of the information processing apparatus executing a computer program that has been stored on a memory.

The flowchart for step S404 in the Second Embodiment that is shown in FIG. 12 differs from the flowchart in the First Embodiment that was shown in FIG. 7 on the point that the processing for the step S1201 has been added thereto.

During step S1201, the coefficient for score calculation according to movement distance is determined. That is, the coefficient that will be used during step S701 in the calculation of the score for the penalty P1 according to the movement distance for the obstacle is determined based on an attribute such as the classification of the obstacle, and the like, that was acquired during step S1101.

FIG. 13 is a diagram showing an example of a classification database in the Second Embodiment. In the Second Embodiment the coefficients that are used in the calculation of the score for the penalty P1 are linked to classifications for obstacles and stored in a classification database 1301 such as the one that is shown in, for example, FIG. 13. Therefore, during step S1201, the coefficient is determined by acquiring a coefficient based on a classification of the obstacle from the classification database 1301.

The "ID" column in the classification database 1301 shows an ID for each classification. The "classification" column manages the classifications for obstacles. The "coefficient" column links the coefficients that are used in the calculation of the score for the penalty P1 according to the movement distance for the obstacle with each classification that is managed in each row and manages these. With respect to these coefficients, a coefficient is made larger the more that an obstacle is being classified as needing to have its movement distance shortened, and a coefficient is made smaller the more than an obstacle is being classified as not causing any problems even if the movement distance for this obstacle is long.

Although in the present embodiment, the obstacle attribute information acquisition unit 1001 performed image recognition using a camera that has been attached to the movable apparatus as the method for classifying obstacles, the present disclosure is not limited thereto. Image recognition may also be performed using, for example, a plurality of network cameras and the like that have been installed in the environment in which the movable apparatus operates.

In addition, a model that has been created using machine learning may also be used as the classification method according to image recognition. In addition, this may also be performed by object recognition using a pressure sensor and a laser sensor that have been attached to the movable apparatus. In addition, classification may also be performed according to the size of the obstacle that has been acquired using the obstacle information acquisition unit 301.

Note that the number of columns and the number of rows in the classification database 1301 that is shown in FIG. 13 may also be increased and decreased. In addition, the classification database 1301 may also be managed by each movable apparatus, and the classification database 1301 may also be managed by a central management apparatus such as a server and the like, and the information that is managed in the classification database 1301 may also be acquired by each movable apparatus communicating with the central management apparatus.

Third Embodiment

In the Second Embodiment, the obstacle attribute information acquisition unit 1001 acquired attribute information for the obstacle, and changed the coefficient to be used in the calculation of the score for the penalty P1 according to the movement distance for the obstacle by classifying the obstacles. That is, a more suitable position was determined as the movement destination according to the obstacle attributes.

In the Third Embodiment, in addition to the configuration of the Second Embodiment, a plan changing unit 1403, an obstacle movable apparatus determining unit 1402, and a movable apparatus information acquisition unit 1401 are additionally provided. It is thereby possible to create a plan in which the obstacle is moved to the movement destination according to the classifications of the obstacles that each movable apparatus is able to move.

FIG. 14 is a functional block diagram showing a configuration of the information processing apparatus 1400 according to the Third Embodiment. The information processing apparatus 1400 according to the Third Embodiment differs from the configuration of the information processing apparatus 1000 that was explained in the Second Embodiment on the point that it is further provided with the movable apparatus information acquisition unit 1401, the obstacle movable apparatus determining unit 1402, and the plan changing unit 1403.

That is, in the example of FIG. 14, the movable apparatus information acquisition unit 1401 is connected to the plan changing unit 1403 via the obstacle movable apparatus determining unit 1402, and the plan changing unit 1403 is connected to the obstacle attribute information acquisition unit 1001.

Figure 15:
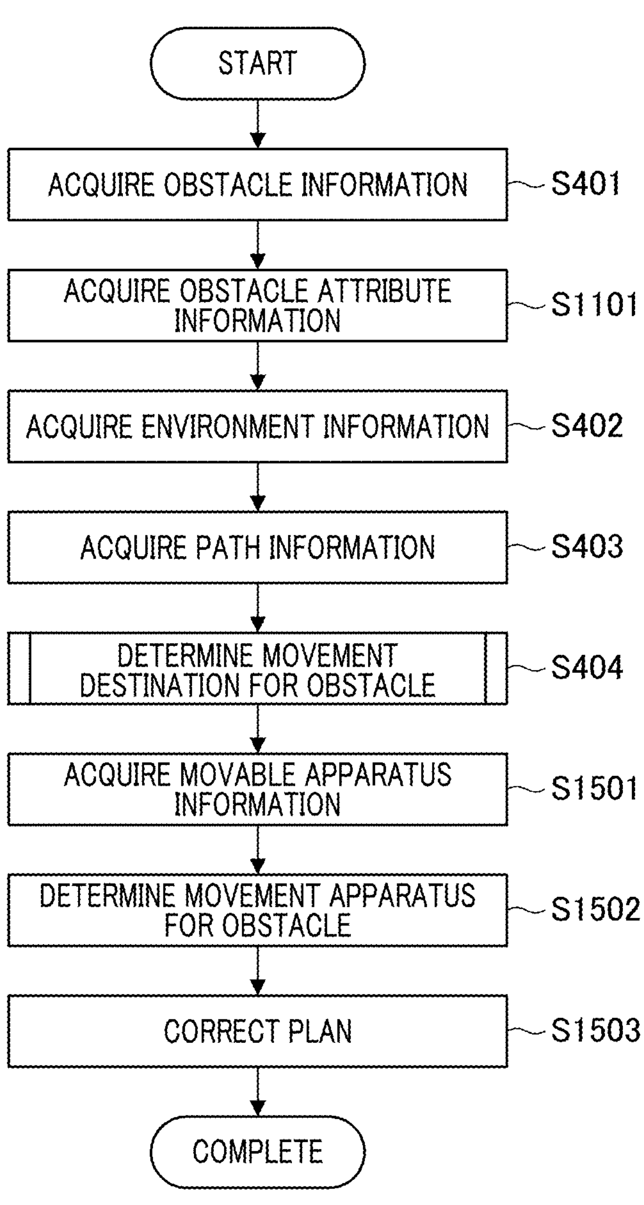
FIG. 15 is a flowchart showing a processing example in the Third Embodiment.

FIG. 15 is a flowchart showing a processing example in the Third Embodiment. The flowchart that is shown in FIG. 15 is a flowchart in which three pieces of processing, a step S1501, a step S1502, and a step S1503 have been added to the flowchart showing the basic flow for the Second Embodiment that was explained using FIG. 11.

Note that the operations for each step in the flowchart in FIG. 15 are performed in order by the CPU and the like that serves as a computer inside of the information processing apparatus executing a computer program that has been stored on a memory.

After the movement destination for the obstacle has been determined during step S404 in FIG. 15, during step S1501, the movable apparatus information acquisition unit 1401 acquires movable apparatus information (attribute information) for each movable apparatus that is operating in the environment. The information that is acquired is the classifications for the obstacles that each movable apparatus is able to move.

FIG. 16 is a diagram showing an example of a movable apparatus information management database in the Third Embodiment. In the Third Embodiment, the attribute information for each movable apparatus is managed using a database format by a movable apparatus information management database 1601 such as that shown in FIG. 16.

The "ID" column in the movable apparatus information database 1601 shows an ID for each piece of movable apparatus information. Unique names for the movable apparatuses are managed in the "movable apparatus" column. Attribute information for movable apparatuses relating to classifications (categories) of the obstacles that a movable apparatus is able to move, which is managed for each row, is managed in the "corresponding obstacle classification"

During step S1501, the classification of the obstacles that each movable apparatus is able to move is acquired by acquiring the "corresponding obstacle classification", which is attribute information for each movable apparatus from the movable apparatus information management database 1601.

During step S1502, the obstacle movable apparatus determining unit 1402 determines the movable apparatus that will move the obstacle based on obstacle information that has been classified in the obstacle attribute acquisition unit 1001, and attribute information for the movable apparatus that was acquired by the movable apparatus information acquisition unit 1401. The obstacle movable apparatus determining unit 1402 determines the movable apparatus that will move the obstacle based on the attribute information for the movable apparatus.

That is, the movable apparatus information management database 1601 that is shown in FIG. 16 is used, the movable apparatus that includes the classification for the obstacle that was acquired during step S1101 in the "corresponding obstacle classification" column is extracted and the movable apparatus for moving the obstacle is determined.

For example, in a case in which the classification for the obstacle that was acquired during step S1101 is "C", the "ID" for the movable apparatus for which "C" is included in the "corresponding obstacle classification" column is "3", and the movable apparatus information is "c". Therefore, "c" is determined as the movable apparatus for moving the obstacle. Note that in a case in which a plurality of extracted movable apparatuses exists, the movable apparatus with the closest distance to the obstacle is selected.

During step S1503, the plan changing unit 1403 changes the movement plan for the movable apparatus, which is an obstacle moving unit that was determined during step S1502, and adds the plan for moving the obstacle that was recognized during step S401 to the obstacle movement destination that was determined during step S404 as an interruption.

Note that although in the Third Embodiment, in a case in which a plurality of movable apparatuses has been extracted to serve as the moving unit for the obstacle during step S1502, the movable apparatus with the closest distance to the obstacle was selected, the present disclosure is not limited thereto. This may also be assigned to the movable apparatus that is currently executing the task with the lowest degree of priority, or the movable apparatus with a task for which the degree of priority is a predetermined value or less based on the plan for the tasks that are assigned to each movable apparatus.

In addition, the schedules for each of the tasks that each of the movable apparatuses are currently executing may be compared, and the movement of the obstacle may also be assigned to the movable apparatus that has the least delays in its schedule, the movable apparatus that has the greatest margins in its schedule, and the movable apparatus that has a task with the latest time limit.

Conversely, the movement of the obstacle may also be assigned to a movable apparatus that fulfills at least one of the plurality of conditions of the delays in the schedule being equal to or less than predetermined value, the margins for the schedule being equal to or greater than a predetermined value, the time limit for the task being at or after a predetermined point in time, or the remaining battery being equal to or greater than a predetermined value. In this case, the assignment of the movement of the obstacle may also be prioritized for the movable apparatus that fulfills the most conditions out of the above-described plurality of conditions.

In addition, although in the Third Embodiment, the three units of the plan changing unit 1403, the obstacle movable apparatus determining unit 1402, and the movable apparatus information acquisition unit 1401 were added to the configuration of FIG. 10, the present disclosure is not limited thereto. It may also be made such that at least the plan changing unit 1403 is added, and a plan to move the obstacle to the obstacle to the obstacle movement destination during step S404 is added to the plan for the movable apparatus that was recognized during step S401.

Note that the number of columns and the number of rows for the movable apparatus information management database 1601 that was shown in FIG. 16 may also be made larger and smaller. In addition, the movable apparatus information management database 1601 may also be managed by each movable apparatus, and the movable apparatus information management database may also be managed by a central management apparatus such as a server and the like, and the information that is managed by the movable apparatus information management database 1601 may also be acquired by each movable apparatus communicating with the central management apparatus.

Fourth Embodiment

Although in the First Embodiment, the appropriate movement destination for an obstacle is determined, in the Fourth Embodiment, an information notification unit that is not shown is added to the configuration of the First Embodiment, and this is configured to make external notifications of the movement destination for the obstacle that has been determined by the obstacle movement destination determining unit 304.

The information notification unit makes notifications to the surroundings of the movable apparatus using, for example, audio and the like, with respect to at least one of a type of obstacle, that the obstacle is being moved, and to which movement destination the obstacle is being moved. Conversely, the above-described notification contents may also be transmitted to the central management apparatus such as a server and the like, and a screen display may be performed using a GUI. Conversely, a notification that combines audio and a screen display may also be performed.

Figure 17:
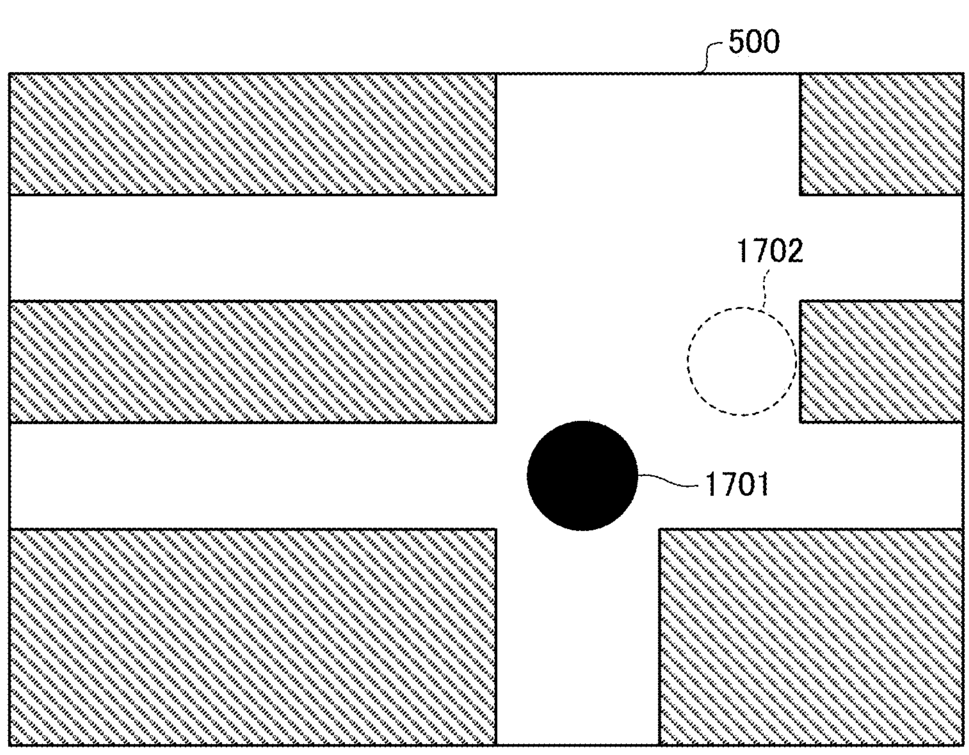
FIG. 17 is a diagram showing an example of a display on a GUI in the Third Embodiment.

FIG. 17 is a diagram showing an example of a display to a GUI in the Third Embodiment. In the display example that is shown in FIG. 17 an image is shown of an obstacle 1701, and an obstacle movement destination 1702 that is the movement destination for the obstacle 1701, which both exist in an environment 50, are shown as an image.

In FIG. 17, the classification of the obstacle 170, the unit for moving the obstacle 170, and the like may also be further displayed. Furthermore, a GUI for allowing the user to select and determine the unit for moving the obstacle, the movement destination, and whether or not to perform movement may also be displayed.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the information processing apparatus and the like through a network or various storage media. Then, a computer (or a CPU, an MPU, and the like) of the information processing apparatus and the like may be configured to read and execute the program. In such a case, the program and the storage medium storing the program configure the present invention.

In addition, the present invention includes those realized using at least one processor or circuit configured to perform functions of the embodiments explained above. For example, a plurality of processors may be used for distribution processing to perform functions of the embodiments explained above.

This application claims the benefit of priority from Japanese Patent Application No. 2024-066760, filed on Apr. 17, 2024, which is hereby incorporated by reference herein in its entirety.

What is claimed is:

1. An information processing apparatus comprising at least one processor or circuit configured to function as:

an obstacle information acquisition unit configured to acquire obstacle information relating to an obstacle;

a path information acquisition unit configured to acquire path information for a path on which a movable apparatus will move with respect to a plurality of movable apparatuses;

an environment information acquisition unit configured to acquire environment information relating to a range in which the obstacle can be moved in an environment in which the movable apparatus is moving; and an obstacle movement destination determining unit configured to determine (a) a first score for movement destination candidate points for the obstacle based on a movement distance for the obstacle, (b) a second score for the movement destination candidate points based on the path information of the plurality of movable apparatuses and the environment information, the second score being determined according to an overlap range for a region through which the movable apparatus will pass and a region taken up by the obstacle in a movement destination candidate point, and (c) a movement destination for the obstacle based on the determined first score and the determined second score, wherein one of the plurality of movable apparatuses moves the obstacle to the movement destination.

2. The information processing apparatus according to claim 1, wherein the obstacle information includes position information for the obstacle, and the obstacle movement destination determining unit is configured to determine the first score according to a distance from a position of the obstacle to a movement destination candidate point.

3. The information processing apparatus according to claim 1, wherein the obstacle movement destination determining unit is configured to determine the movement destination based on attribute information for the obstacle.

4. The information processing apparatus according to claim 3, wherein the obstacle movement destination determining unit is configured to determine the movement destination according to whether or not the attribute information includes information relating to areas where passage is prohibited.

5. The information processing apparatus according to claim 3, wherein the obstacle movement destination determining unit is configured to determine the movement destination according to a weight of the obstacle based on the attribute information.

6. The information processing apparatus according to claim 1, wherein the at least one processor or circuit is further configured to function as an obstacle movable apparatus determining unit configured to determine a movable apparatus to move the obstacle based on attribute information for the movable apparatus.

7. The information processing apparatus according to claim 1, wherein the at least one processor or circuit is further configured to function as an information notification unit configured to make a notification of the movement destination.

8. An information processing method comprising:

acquiring obstacle information relating to an obstacle;

acquiring path information for a path on which a movable apparatus will move with respect to a plurality of movable apparatuses;

acquiring environment information relating to a range in which the obstacle can be moved in an environment in which the movable apparatus is moving; and determining (a) a first score for movement destination candidate points for the obstacle based on a movement distance for the obstacle, (b) a second score for the movement destination candidate points based on the path information of the plurality of movable apparatuses and the environment information, the second score being determined according to an overlap range for a region through which the movable apparatus will pass and a region taken up by the obstacle in a movement destination candidate point, and (c) a movement destination for the obstacle based on the determined first score and the determined second score, wherein one of the plurality of movable apparatuses moves the obstacle to the movement destination.

9. A non-transitory computer-readable storage medium storing a computer program including instructions for executing following processes:

acquiring obstacle information relating to an obstacle;

acquiring path information for a path on which a movable apparatus will move with respect to a plurality of movable apparatuses;

acquiring environment information relating to a range in which the obstacle can be moved in an environment in which the movable apparatus is moving; and determining (a) a first score for movement destination candidate points for the obstacle based on a movement distance for the obstacle, (b) a second score for the movement destination candidate points based on the path information of the plurality of movable apparatuses and the environment information, the second score being determined according to an overlap range for a region through which the movable apparatus will pass and a region taken up by the obstacle in a movement destination candidate point, and (c) a movement destination for the obstacle based on the determined first score and the determined second score, wherein one of the plurality of movable apparatuses moves the obstacle to the movement destination.

* * * * *